(12) United States Patent
Kossi et al.

(10) Patent No.: US 8,019,383 B2
(45) Date of Patent: Sep. 13, 2011

(54) TECHNIQUES TO INCREASE COVERAGE OF PUSH-TO-TALK WIRELESS NETWORKS

(75) Inventors: Jouni Kossi, Espoo (FI); Martti E. Virtanen, Helsinki (FI)

(73) Assignee: Nokia Corporation, Espoo (FI)

( * ) Notice: Subject to any disclaimer, the term of this patent is extended or adjusted under 35 U.S.C. 154(b) by 965 days.

(21) Appl. No.: 11/624,204

(22) Filed: Jan. 17, 2007

(65) Prior Publication Data
US 2008/0171567 A1 Jul. 17, 2008

(51) Int. Cl.
H04M 1/00 (2006.01)
(52) U.S. Cl. ............... 455/553.1; 455/518; 455/519; 455/520; 455/90.2; 455/500
(58) Field of Classification Search .......... 455/517–520, 455/90.2, 78, 79, 500, 426.1, 422.1, 416, 455/420, 553.1; 370/352, 389, 338, 328, 370/327, 340
See application file for complete search history.

(56) References Cited

U.S. PATENT DOCUMENTS

| | | | |
|---|---|---|---|
| 7,107,017 B2 | 9/2006 | Koskelainen et al. | |
| 7,536,195 B2* | 5/2009 | Yoon et al. | 455/518 |
| 7,636,581 B1* | 12/2009 | Choksi et al. | 455/519 |
| 2001/0021185 A1* | 9/2001 | Heusala | 370/352 |
| 2003/0053434 A1 | 3/2003 | Chow et al. | |
| 2003/0124983 A1* | 7/2003 | Parssinen et al. | 455/69 |
| 2003/0187926 A1* | 10/2003 | Karjanlahti | 709/204 |
| 2004/0082296 A1* | 4/2004 | Twitchell, Jr. | 455/41.2 |
| 2004/0192364 A1 | 9/2004 | Ranalli et al. | |
| 2004/0193449 A1* | 9/2004 | Wildman et al. | 705/2 |
| 2004/0236954 A1* | 11/2004 | Vogt et al. | 713/186 |
| 2005/0079885 A1 | 4/2005 | Patino et al. | |
| 2005/0141464 A1* | 6/2005 | Willey et al. | 370/337 |
| 2005/0153731 A1* | 7/2005 | McKinney et al. | 455/552.1 |
| 2005/0186970 A1 | 8/2005 | Yates et al. | |
| 2005/0202825 A1* | 9/2005 | Puranik et al. | 455/450 |
| 2006/0002328 A1* | 1/2006 | Naghian | 370/328 |

(Continued)

FOREIGN PATENT DOCUMENTS

DE 10115140 10/2002

(Continued)

OTHER PUBLICATIONS

"International Application Serial No. PCT/US2008/000095, Search Report mailed Jul. 7, 2008", P220, 11pgs.

(Continued)

Primary Examiner — Dominic E Rego
(74) Attorney, Agent, or Firm — Ditthavong Mori & Steiner, P.C.

(57) ABSTRACT

Various example embodiments are disclosed relating to wireless networks, such as relating to techniques to improve coverage of push-to-talk wireless networks or services. In an example embodiment, a technique may include forwarding data to a remote push-to-talk (PTT) wireless network via an intermediary device of an intermediary wireless network if the data is received from a wireless device of a local push-to-talk (PTT) wireless network, forwarding data directly to one or more wireless devices of the local PTT wireless network if the data is received from the remote PTT wireless network via the intermediary device, and forwarding data to one or more wireless devices of the local PTT wireless network and to the remote PTT wireless network via the intermediary device of the intermediary wireless network if the data is generated locally.

20 Claims, 5 Drawing Sheets

U.S. PATENT DOCUMENTS

| | | | |
|---|---|---|---|
| 2006/0035659 A1* | 2/2006 | Yoon et al. | 455/518 |
| 2006/0053386 A1* | 3/2006 | Kuhl et al. | 715/773 |
| 2006/0121925 A1* | 6/2006 | Jung | 455/518 |
| 2006/0234696 A1* | 10/2006 | Cho | 455/424 |
| 2007/0015514 A1* | 1/2007 | Bishop | 455/445 |
| 2007/0069890 A1* | 3/2007 | Tuck | 340/539.13 |
| 2007/0082614 A1* | 4/2007 | Mock | 455/41.2 |
| 2007/0123285 A1* | 5/2007 | Baudino et al. | 455/518 |
| 2007/0243900 A1* | 10/2007 | Edwards et al. | 455/554.1 |
| 2007/0254606 A1 | 11/2007 | Dunko | |
| 2007/0298835 A1* | 12/2007 | Uehara et al. | 455/552.1 |
| 2008/0101274 A1* | 5/2008 | Gilmore et al. | 370/315 |
| 2008/0192265 A1* | 8/2008 | Weiss | 358/1.6 |
| 2009/0124271 A1* | 5/2009 | Roundtree et al. | 455/466 |
| 2009/0191822 A1* | 7/2009 | Chen et al. | 455/90.2 |

FOREIGN PATENT DOCUMENTS

| | | |
|---|---|---|
| EP | 1928161 A1 | 6/2008 |
| FR | 2787958 | 6/2000 |
| GB | 2357009 | 6/2001 |
| JP | 3022864 A | 1/1991 |
| WO | WO/0167684 | 3/2001 |
| WO | 2008002327 A1 | 1/2008 |
| WO | 2008087532 A2 | 7/2008 |
| WO | 2008087532 A3 | 7/2008 |

OTHER PUBLICATIONS

"Chat Now Communicator, 75028 Asst., 72970 Asst.", Hasbro, Tiger Electronics, Tigertoys.com, (2005),1-20 pgs.

Nokia Corporation, "Push to Talk over Cellular—Nokia Stay Connected, White Paper" 2005, pp. 1-12.

Disney Mobile, "Disney Mobile: Optional Services and Features", online, http://disneymobile.go.com/disneymobile/browseShop.do?method=view, p. 1, 2003-2006.

Sprint Nextel, "Parental Control Quick Start Guide" 2006, online, http://www1.sprintpcs.com/explore/ueContent.jsp?scTopic=parentalControl, pp. 1-2.

Steve Barber, "TETRA Gateway and Repeater Applications for Voice and Data", Tetra, Jun. 2005, pp. 1-18.

ETSI, "Electromagnetic compatibility and Radio spectrum Matters Peer-to-Peer Digital Private Mobile Radio using FDMA with a channel spacing of 6,25 kHz with e.r.p of up to 500 mW", ETSI TS 102 490 V1.1.1 (Dec. 2005), pp. 1-69, France.

ETSI, "Electromagnetic compatibility and Radio spectrum Matters (ERM); Technical Requirements for Digital Mobile Radio (DMR); Part 1: Air Interface (AI) protocol", ETSI TS 102 361-1 V1.1.1 (Apr. 2005), pp. 1-145, France.

Francesco Pasquali, Selex Communications, "The power of TETRA—Direct Mode Operation", Tetra, Oct. 2002, pp. 1-29.

Hasbro, "Chat Now" 2005, www.hasbro.com, pp. 1-20.

Nokia Corporation, "Nokia Push to Talk—Nokia Stay Connected" 2005, pp. 1-2.

Sprint Nextel, "Spring Parental Control: Peace of Mind for Parents" online, http://www1.sprintpcs.com/explore/ueContent.jsp?scTopic=parentalControl, 2006.

* cited by examiner receiving a request for communication between a local push-to-talk (PTT) device within a local PTT network and a device outside the local PTT network;

— 402 determining that the device outside the local PTT network is on an access list for the local PTT device;

— 404 providing the communication based on the determining.

TECHNIQUES TO INCREASE COVERAGE OF PUSH-TO-TALK WIRELESS NETWORKS

BACKGROUND

A wide range of wireless networks have been developed. These wireless networks may include, Wireless Local Area Networks (WLANs), cellular networks such as GSM (Global System for Mobile Communication), shorter range wireless communications such as Bluetooth and others. Another example of wireless networks or wireless services that is available is Push-To-Talk (PTT) wireless networks (or services), which typically provides a direct one-to-one or one-to-many voice communication service for mobile communications. It is considered to have an "always on" connection, where typically half-duplex communication can be initiated to both individuals and talk groups simply with the push of a button on a mobile device. To the user, the service is similar to the traditional "walkie talkie" service, but may be more powerful as it may be digital, and may in some cases allow specific addressing of individual recipients (or devices) or groups, and other features.

However, PTT networks have limitations. For example, PTT networks may in some cases allow direct communication with other users within a PTT sub-group (or local PTT network). Thus, the range of most PTT networks may be limited.

Techniques are desirable that may improve PTT networks, such as improving coverage of a PTT network or allowing communication between different PTT networks or sub-groups.

SUMMARY

Various example embodiments are disclosed relating to wireless networks, and also relating to push-to-talk wireless networks.

According to an example embodiment, an apparatus may include a first wireless transceiver configured to transmit and receive data over a local push-to-talk (PTT) wireless network, a second wireless transceiver configured to transmit and receive data over a second (or intermediary) wireless network in order to communicate with a device in a remote PTT wireless network coupled to the second wireless network, and a controller. The controller may be configured to select a mode of operation for the apparatus, including:

1) for data received via the first wireless transceiver or the second wireless transceiver, transmit or forward the received data via the second wireless transceiver or the first wireless transceiver, respectively; and 2) for data originated or generated by the apparatus, transmit the data via both the first wireless transceiver and the second wireless transceiver.

According to another example embodiment, a technique may include forwarding data to a remote push-to-talk (PTT) wireless network via an intermediary device of an intermediary wireless network if the data is received from a wireless device of a local push-to-talk (PTT) wireless network, forwarding data directly to one or more wireless devices of the local PTT wireless network if the data is received from the remote PTT wireless network via the intermediary device, and forwarding data to one or more wireless devices of the local PTT wireless network and to the remote PTT wireless network via the intermediary device of the intermediary wireless network if the data is generated locally.

The controller being configured to select a mode of operation may include, for example:

1a) for data received via the first wireless transceiver, transmit or forward the received data via the second wireless transceiver to an intermediary device within the second wireless network to allow the data to be forwarded by the intermediary device to the remote PTT wireless network;

1b) for data received via the second wireless transceiver, transmit or forward the received data via the first wireless transceiver directly or peer-to-peer to one or more devices within the first PTT wireless network; and 2) for data originated or generated by the apparatus, transmit the data via both the first wireless transceiver and the second wireless transceiver.

According to another example embodiment, a system may be provided. The system may include, for example, a wireless interface device coupled to a local push-to-talk (PTT) wireless network and a second wireless network, the wireless interface device may be configured to operate as both 1) a wireless device configured to communicate directly or in a peer-to-peer fashion with other wireless devices within the local PTT wireless network, and 2) an interface device configured to forward data between the other wireless devices of the PTT wireless network and the second wireless network.

According to another example embodiment, a technique may include receiving a request for communication between a local push-to-talk (PTT) device within a local PTT network and a device outside the local PTT network, determining that the device (e.g., wireless device, wireline device) outside the local PTT network is on an access list for the local PTT device, and providing the requested communication based on the determining.

The details of one or more implementations are set forth in the accompanying drawings and the description below. Other features will be apparent from the description and drawings.

BRIEF DESCRIPTION OF THE DRAWINGS

FIG. 4 is a flow chart illustrating operation of a wireless device according to an example embodiment.

DETAILED DESCRIPTION

Figure 1:
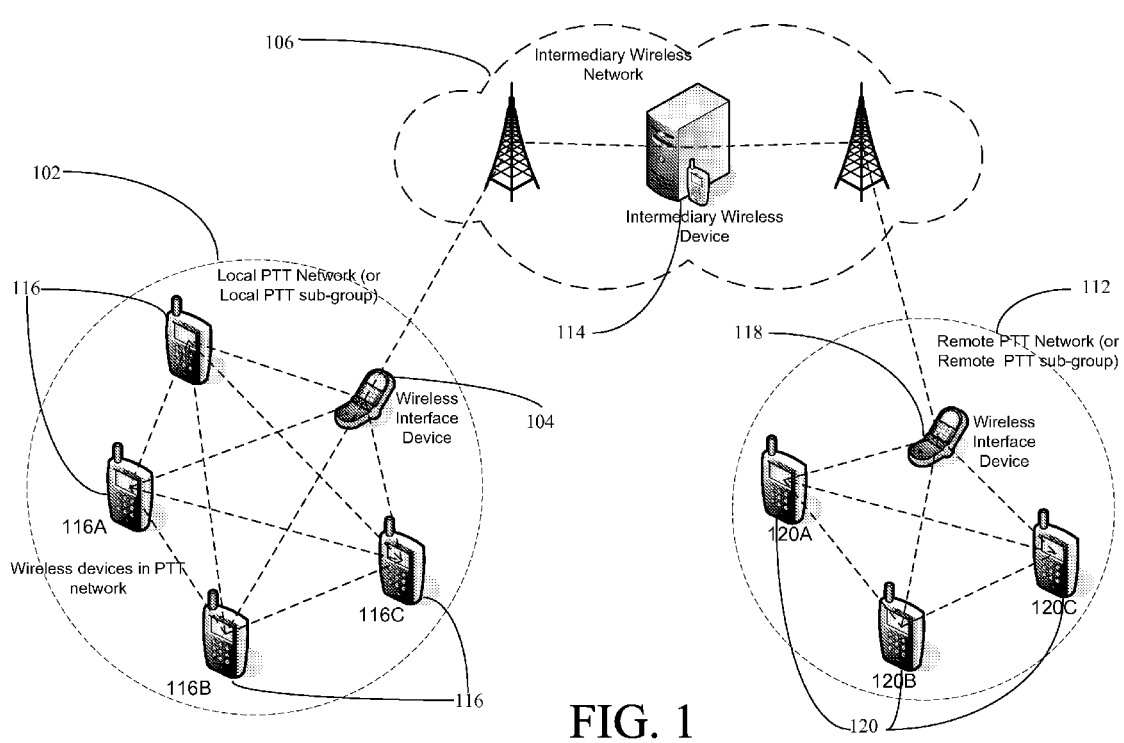
FIG. 1 is a block diagram illustrating a local push-to-talk (PTT) wireless network, a remote PTT wireless network, and an intermediary wireless network, according to an example embodiment.

Referring to the Figures in which like numerals indicate like elements, FIG. 1 is a block diagram illustrating communication between a local Push-To-Talk (PTT) wireless network and other networks. A first PTT network (or first PTT sub-group) 102 may include any number of wireless PTT devices, such as wireless PTT devices 104 and 116 (including devices 116A, 116B and 116C). Similarly, a second PTT wireless network (or a second PTT sub-group) 112 may include wireless devices 118 and 120A, 120B and 120C.

PTT wireless networks (or PTT sub-groups) 102 and 112 may, for example, provide a direct one-to-one or one-to-many voice communication service for mobile communications. It may be considered to have an "always on" connection, where typically half-duplex communication can be initiated to both individuals and talk groups simply with the push of a button on a mobile device, for example. The members (or devices) of the PTT wireless network (or PTT sub-group) may be capable of communicating with each other directly on a peer-to-peer basis. Although not shown, PTT wireless networks 102 and 112 may also provide for indirect communication between wireless devices via a repeater or base station. Such PTT networks or PTT service may also be known as digital walkie-talkie service or the like. Wireless devices may communicate with each other via half duplex secure communications, for example. Devices may also communicate within each PTT network via full duplex communications, in another example embodiment.

Although only two PTT networks (or PTT sub-groups) (102, 112) are shown, any number may be provided. Within each PTT network (or sub-group) 102 or 112, devices may be able to directly communicate with each other, e.g., in a one-to-one or one-to-many communications, for example.

PTT wireless networks 102 and 112 may use a variety of different wireless technologies, such as Digital Mobile Radio (DMR), which may be the same as or similar to technology described in standards or specifications: ETSI TS 102 490 v1.1.1: Electromagnetic compatibility and Radio Spectrum Matters (ERM); Peer-to-peer Digital Private Mobile Radio Using FDMA with a channel spacing of 6.25 KHz with erp of up to 500 mW. (December 2005); ETSI TS 102 361-1: v1.1.1: Electromagnetic Compatibility and Radio spectrum Matters (ERM); Technical Requirements for Digital Mobile Radio (DMR); Part 1: Air Interface (AI) protocol. (April 2005), or other technology. These are just two example PTT or wireless technologies. Many other PTT standards, specifications or technologies may be used. Other types of wireless networks may be used, such as push-to-talk over cellular (PoC), or other network.

In addition, the PTT networks 102 and 112 may transmit a wide variety of types of data, such as text, graphics, audio, video and voice or speech. The term "data" may include one or more of these data types, as examples.

The two PTT wireless networks 102 and 112 may be coupled together via an intermediary wireless network 106. Intermediary wireless network 106 may be any type of wireless network, such as a cellular wireless network, a PTT over cellular (PoC) network, a wireless local area (WLAN) network, a WiMAX wireless network, a cellular network such as a GSM (Global System for Mobile Communications) wireless network or other cellular network, a GPRS (General Packet Radio Service) wireless network, or other wireless network. In an example embodiment, devices within PTT wireless network (or PTT sub-group) 102 may not be able to directly communicate (e.g., peer to peer) with devices within wireless PTT network 112 (e.g., in some cases). Therefore, intermediary wireless network 106 may couple or interface various separate PTT wireless networks or PTT sub-groups (such as PTT networks 102 and 112), e.g., which otherwise may not be able to communicate very easily.

Intermediary wireless network 106 may include, for example, an intermediary wireless device 114, which may operate as an intermediary or interface between PTT wireless networks, for example. In an example embodiment, intermediary wireless device 114 may exchange data between various wireless PTT wireless networks (or between various PTT sub-groups), such as between wireless PTT network (or sub-group) 102 and wireless PTT network (or sub-group) 112, for example. Intermediary device 114 may, for example, receive data from a device within PTT network 102, and forward the data on to a device in PTT wireless network 112, or vice versa. Intermediary wireless device 114 may include, for example, a base station (e.g., for cellular or GSM or GPRS network), an access point (e.g., for WLAN or WiMAX networks), a gateway, a PoC server (for a PoC network), or other intermediary device that may operate as an intermediary between PTT wireless networks. The use of an intermediary wireless device 114 may, in effect (e.g., as seen or experienced by a PTT device user), extend the perceived or operational coverage of a PTT wireless network, even though the actual direct transmission coverage of each of the PTT networks may be limited to the local PTT network or sub-group (e.g., range of 3-5 km). In another example embodiment, intermediary device 114 may include multiple intermediary devices or related infrastructure, not shown.

Each PTT wireless network or PTT sub-group may include a wireless device that operates as an interface device (or gateway) between one or more wireless devices of a local PTT network (or local PTT sub-group) and the intermediary network 106. For example, PTT wireless networks 102 and 112 may include a device, such as wireless devices 104 and 118, respectively, that may operate as a wireless interface device between their respective local PTT wireless networks and the intermediary network 106. For example, wireless device 104 may operate (or may be configured or enabled to operate) as a wireless interface (or gateway) between one or more of wireless devices 116 of local PTT wireless network 102 and intermediary network 106. Likewise, wireless device 118 may operate (or be configured or enabled to operate) as a wireless interface (or gateway) between one or more of wireless devices 120 of the PTT network 112 and intermediary network 106, for example. Thus, when enabled (or selected to operate) as interface devices, devices 104 and 118 may be referred to as wireless interface devices, for example.

In an example embodiment, the designation or selection of a wireless device as an interface device (interface between a local PTT network or sub-group and an intermediary network 106) may be static or fixed, or may be dynamically selected (or configured) to allow different wireless devices within a PTT network to be selected as interface device at different times. In another example embodiment, more than one wireless device may be selected or configured to operate as interface device, for example.

The wireless interface device 104 may be configured to communicate with the intermediary wireless network 106, and to communicate directly or in a peer-to-peer fashion with other wireless devices within the local PTT wireless network 102. The wireless interface device 104 may also be capable forwarding data between the intermediary wireless network 106 and the other wireless devices within the local PTT wireless network 102. Wireless interface device 118 may operate in a similar fashion with respect to wireless PTT network 112. In general, example details of the operation of wireless interface device 104 may be described or provided herein as an example, and other wireless interface devices (such as interface device 118) may operate in the same or a similar fashion.

Figure 2:
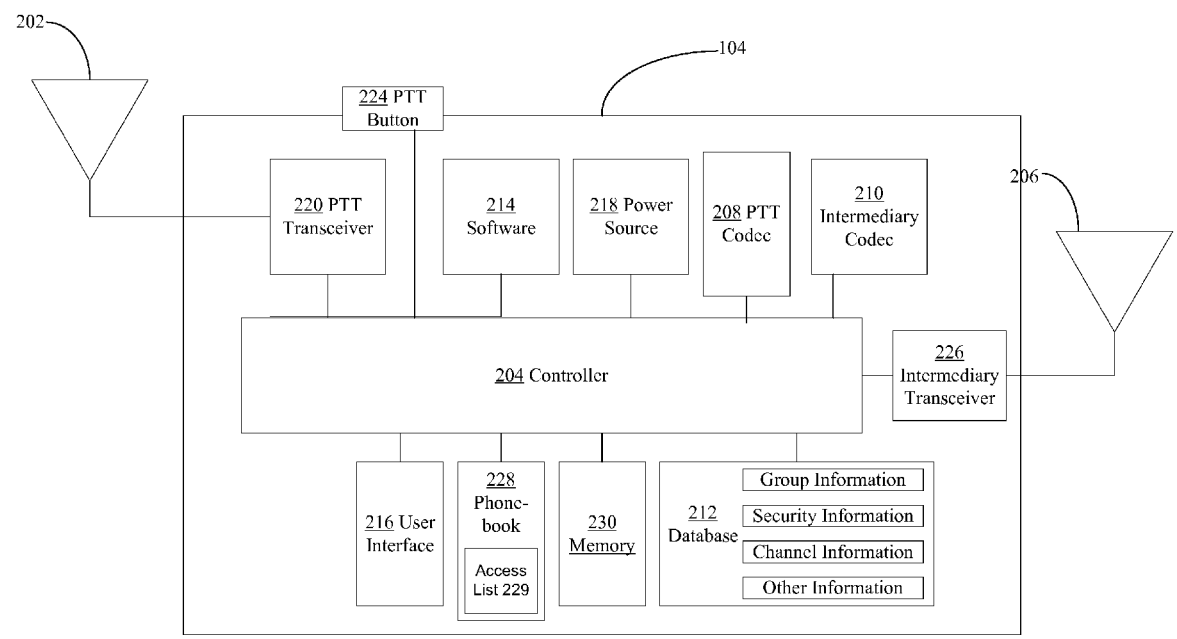
FIG. 2 is a block diagram illustrating a wireless interface device according to an example embodiment.

FIG. 2 is a block diagram of a wireless interface device 104 according to an example embodiment. The wireless interface device 104 shown in FIG. 2 may illustrate some, but not necessarily all, example components that may be provided in wireless interface device 104, according to an example embodiment. The various blocks or components shown in the block diagram of FIG. 2 may be hardware, software (e.g., software executed by a controller or processor), or a combination of both hardware and software.

Wireless interface device 104 may include a controller 204 to execute software 214 or code, and to provide overall control of wireless interface device 104. A memory 230 may be coupled to controller 204 to store software, code, instructions or data, for example. A power source 218 may be provided, such as a battery or other power source, to supply power to components of the wireless interface device 104.

In an example embodiment, although not required, the PTT wireless network 102 and intermediary wireless network 106 may use different standards or technologies, which may include using one or more different transmission frequencies, frame formats, wireless media access techniques, encryption techniques, audio, speech or video coding/decoding techniques, and the like. Therefore, in an example, wireless interface device 104 may include a wireless PTT transceiver 220 to transmit and receive data over wireless PTT network 102 in order to communicate (e.g., directly or peer to peer) with one or more wireless PTT devices, e.g., within local PTT wireless network 102.

Wireless interface device 104 may also include an intermediary network wireless transceiver (intermediary transceiver) 226 to transmit and receive data over intermediary wireless network 106, e.g., in order to communicate with intermediary device 114. Thus, wireless interface device 104 may, for example, use intermediary transceiver 226 to communicate with a wireless PTT device in a remote PTT network 112 via intermediary device 114. In an example embodiment, wireless transceivers 220 and 226 may perform various PHY (physical layer) and MAC (media access control) related functions, such as modulation/demodulation, FEC (forward error correction) coding and error correction/detection, framing of data, wireless transmission/reception, etc.

Separate antennas or a common antenna may be used for example, within wireless interface device 104. In an example embodiment, antenna 202 may be coupled to PTT transceiver 220, and antenna 206 may be coupled to intermediary transceiver 226.

As noted, PTT wireless network 102 and intermediary wireless network 106 may use different coding/decoding techniques or standards for audio, speech, graphics and video data, for example. Therefore, to accommodate codec standards for both networks (to the extent these may be different), wireless interface device 104 may include a PTT codec (coder/decoder) 208 and an intermediary network codec (intermediary codec) 210, to perform coding and/or decoding of data as required by PTT wireless network 102 and intermediary wireless network 106, respectively. Codecs 208 and 210 may be, for example, one or more of audio codecs, speech codecs, video codecs, or other codecs.

For example, data transmitted via the PTT wireless transceiver 220 may be encoded into a PTT-compatible encoded format by PTT codec 208, and the data transmitted via the intermediary transceiver 226 may be encoded into an intermediary network-compatible encoded format by intermediary codec 210.

PTT wireless network 102 and intermediary wireless network 106 may also use different security or encryption techniques to provide secure wireless communications. Thus, wireless interface device 104 may include a PTT security module (not shown) to perform encryption/decryption and/or other security related processing for PTT wireless network communications, and may also include an intermediary security module (not shown) to perform encryption/decryption and/or other security related processing for intermediary wireless network communications. The PTT and intermediary security modules, codecs and other blocks shown in FIG. 2 may be hardware, software, or a combination of both hardware and software, for example.

Wireless interface device 104 illustrated in FIG. 2 may also include a user interface 216, which may include, for example: an audio input device such as a microphone, an audio output device such as a speaker, a data output device such as a display, and a data input device such as a keypad or pointing device (not shown).

A PTT button 224 is also provided. A user of wireless interface device 104 may press PTT button 224 (or other button) to send data (e.g., text, speech) via a call or data transmission (e.g., direct or peer to peer) to another wireless device, for example. This PTT button 224 (or other mechanism), for example, may allow locally generated (or locally originated) data (e.g., text, graphics, audio, speech) by interface device 104 to be transmitted to one or more other PTT devices (local and/or remote PTT devices), such as by direct communication to other local PTT devices and via intermediary device 114 to remote PTT devices. For example, pressing the PTT button 224 may cause locally generated voice or data (e.g., input or spoken by a user of device 104) to be transmitted from wireless interface 104 both to local PTT devices 116 via PTT transceiver 220 and to remote PTT devices 120 via intermediary transceiver 226, in an example embodiment. Controller 204, e.g., under control of software, may also control PTT button 224 to cause data to be transmitted via one or both of transceivers 220 and 226, for example.

The wireless interface device 104 shown in FIG. 2 may also include a phone book 228, which may include identification data (e.g., telephone numbers, addresses, MAC addresses, names, or other identifiers) for one or more users or other wireless devices (e.g., other PTT wireless devices), for example. In another example embodiment, the phone book 228 may also identify the sub-group or PTT network where each wireless device is currently located. For example, a user may place a call or transmit data (e.g., voice, text, email or other data) to another wireless device (such as a PTT wireless device) by selecting a user or device from the phone book and pressing the PTT button or other button or key on the wireless interface device 104, for example.

The wireless interface device 104 may also include a database 212. Although shown as a separate block, database may be stored, for example, within memory 230 or other memory. Database 212 may store information, such as group information. The group information may include a list of devices (e.g., including names, telephone numbers or other identification information) for each PTT network (PTT sub-group). Thus, group information may identify the wireless PTT devices that are part of the local wireless PTT network (local PTT sub-group) 102 (e.g., names/identification information for devices 116A, 116B and 116C of PTT network 102). The group information may also include a list of the wireless devices that may be members of remote (or other) PTT networks, such as a list of the wireless devices within remote wireless PTT network 112 (e.g., identification information for devices 120A, 120B and 120C for remote wireless PTT network 112).

The database 212 may also include security information, such as encryption keys (or other security information) to securely communicate with wireless devices 116 of local PTT wireless network 102, and/or for devices in other PTT networks. Database 212 may also store channel information provided by the controller 204, such as channel quality measurements (e.g., received signal strength indications or RSSI, or signal to interference and noise ratio or SINR) indicating channel quality for communications with one or more other wireless devices. Other information may also be stored in database 212.

The user interface 216 (e.g., including a keypad) may allow a user to select or enable the wireless device 104 as a gateway or wireless interface device for forwarding data between the local wireless PTT devices 116 and the remote PTT wireless network 112. After the wireless interface device 104 has been selected as the gateway or the wireless interface device, the wireless interface device 104 may send a signal to the local wireless devices 116 indicating that the wireless interface device 104 is a gateway or wireless interface device for local PTT wireless network 102, for example.

The controller 204 may route data between the PTT transceiver 220 and the intermediary transceiver 226. In an example embodiment, the controller 204 (e.g., automatically or based on user input or other information) may select (or enable) one or more modes of operation for the wireless interface device 104 from a plurality of modes.

For example, according to a first mode, data originated or generated locally by the wireless interface device 104 may be transmitted via both the PTT transceiver 220 and the intermediary transceiver 226. In this manner, for example, the locally generated data by wireless interface device 104 may be transmitted via PTT transceiver 220 to wireless devices within local PTT wireless network 102 (e.g., via direct communication) and via intermediary transceiver 226 to device(s) in remote PTT wireless network 112. The data forwarded via intermediary transceiver 226 may be transmitted to intermediary device 114, and then forwarded to a wireless interface device 118 in a remote PTT wireless network for delivery or communication to one or more remote PTT devices in remote PTT wireless network 112, for example. Therefore, in this mode, locally generated data (e.g., input by a user via keypad or spoken or input by microphone into device 104), such as audio data, speech data or text, may be transmitted directly to the local wireless devices 116 via the PTT transceiver 220 and via the intermediary transceiver 226 to the remote wireless interface device 118 via the intermediary wireless network 106.

In a second mode, data received via the PTT transceiver 220 or the intermediary transceiver 226 may be transmitted or forwarded via the intermediary transceiver 226 or PTT transceiver 220, respectively. In this mode, for example, the wireless interface device 104 may operate as a router or gateway between the local wireless devices 116 and the remote wireless interface device 118 (via the intermediary device 114).

This mode may be subdivided into a plurality of submodes, such as two submodes. In one of these submodes, data received via the PTT transceiver 220 may be transmitted via the intermediary transceiver 226. In this submode, the data may be received, from a first encoding (e.g., PTT compatible speech or audio coding format) format, and the data may be encoded into the second encoding (e.g., intermediary network compatible) format. In another submode, data received from intermediary network 106 via the intermediary transceiver 226 may be transmitted (or forwarded) via the PTT transceiver 220 to PTT wireless devices in local PTT wireless network 102. In this latter submode, the data may decoded from the second encoding format (e.g., intermediary network compatible format), and the data may be encoded into the first encoding format (e.g., PTT compatible format) before forwarding, as an example, although not required.

In communicating with the intermediary wireless network 106 and the local PTT wireless network 102, the wireless interface device 104 may, if so enabled, may transmit or forward data according to both modes of operation, e.g., depending on a source of data to be transmitted or forwarded. A source of data may include receiving data via a first or second transceiver (220, 226), or data generated locally at the interface device 104. Thus, in an example embodiment, a source of the data to be transmitted or forwarded may determine how the data is processed or forwarded by the wireless interface device 104.

In one mode of operation, where data, such as voice data in an example embodiment, originated with or was generated by the wireless interface device 104, the wireless interface device 104 may transmit the data to both the local PTT wireless network 102 and to the intermediary wireless network 106 (e.g., for forwarding to the remote PTT wireless network 112). This may allow locally generated data (e.g., speech or text) to be transmitted to PTT devices at both local and remote PTT wireless networks, for example. In a second mode of operation, where data may be received from either the local PTT wireless network 102 or the intermediary wireless network 106, the wireless interface device 104 may transmit or forward the data to the intermediary wireless network 106 or the local PTT wireless network 102, respectively.

The wireless interface device 104 may encode and decode data transmitted and received from the intermediary wireless network 106 and to encode and decode data transmitted to and received from the local PTT wireless network 102. The wireless interface device 104 may use a protocol to encode and decode the data transmitted and received from the intermediary wireless network 106 which may be, for example, different from a protocol used to encode and decode the data transmitted and received from the local PTT wireless network 102.

The local wireless devices 116 within PTT wireless network 102 may, for example, be digital mobile radios (DMRs) in direct or peer-to-peer communication with each other and the wireless interface device 104. The wireless interface device 104 and the local wireless devices 116 in this example may form a local DMR sub-group.

Digital mobile radios may, for example, include software configured to allow only one user to speak at a time. In alternative embodiment, one or more of the local wireless devices 116 may include some or all of the capabilities and functionalities of the wireless interface device 104, described above. In this embodiment, the wireless interface device 104 and the one or more local wireless devices 116 may include a user interface configured to allow a user to select the device 116, 104 as a gateway or a wireless interface device for forwarding data between the local PTT wireless network 102 and the remote PTT wireless network 112 through the wireless intermediary wireless network 106. In this embodiment, the wireless interface device 104 or the one or more local wireless devices 116 may, after being selected as the gateway, send a signal to the other members of the local PTT network indicating that the selected wireless interface device 104 or local wireless device 116 is the gateway or wireless interface device. Thus, for example, the intermediary wireless network 106 may thereby route or forward data between the local PTT wireless network 102 and the remote PTT wireless network 112.

Figure 3:
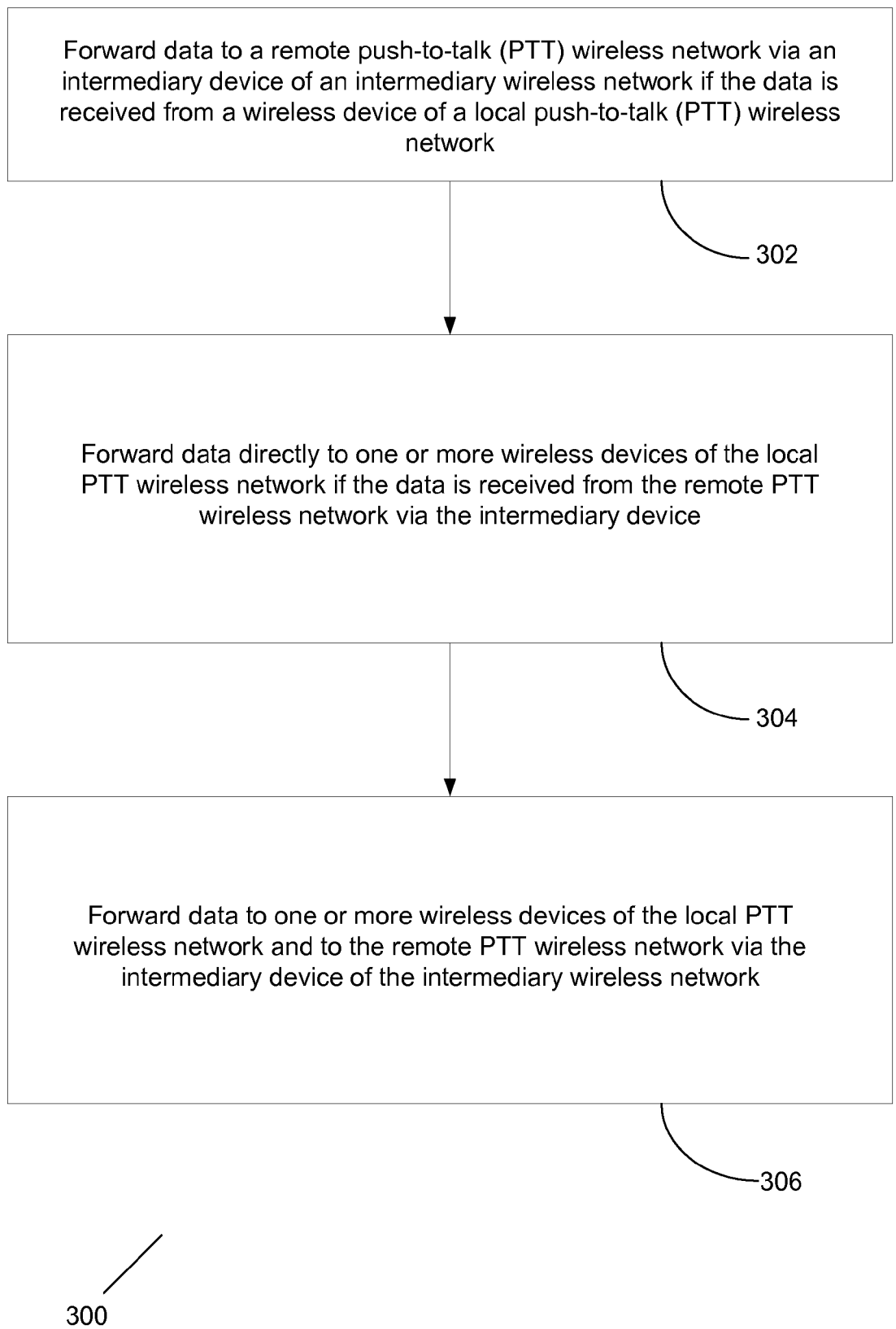
FIG. 3 is a flowchart showing a method of exchanging data between a local push-to-talk (PTT) wireless network and a remote PTT wireless network according to an example embodiment.

FIG. 3 is a flowchart showing a method 300 of exchanging or forwarding data between a local PTT wireless network 102 and a remote PTT wireless network 112 according to an example embodiment.

In this embodiment, at 302, data may be forwarded to the remote PTT wireless network 112 via an intermediary device of an intermediary wireless network 106 if data is received from a wireless device (e.g., device 116) of the local PTT wireless network 102. This may include, for example, receiving data from a local wireless device 116 of the local PTT wireless network 102 via a PTT transceiver 220, using the PTT (audio) codec 208 to decode the received audio data of the first (PTT) encoded format, using a second or intermediary (audio) codec 210 to encode the decoded audio data into the second (e.g., GSM or GPRS, WLAN or other intermediary network) encoded format, and transmitting the encoded data of the intermediary network encoded format using the intermediary transceiver 226 to the remote PTT wireless network 112 via an intermediary device 114.

At 304, data may be forwarded directly to one or more wireless devices 116 of the local PTT wireless network 102 if the data is received from the remote PTT wireless network 112 via the intermediary device 114. This may include, for example, receiving data of the second (intermediary network compatible) encoded format from an intermediary device 114 via the intermediary transceiver 226, using the second or intermediary (e.g., audio) codec 210 to decode the received data of the second encoded format, using the first or PTT codec 208 to encode the decoded data into the first or PTT compatible encoded format, and transmitting the encoded audio data of the first or PTT compatible encoded format via the PTT transceiver 220 to one or more local wireless devices 116 of the local PTT wireless network 102.

At 306, data may be forwarded to one or more wireless devices 116 of the local PTT wireless network 102 and to the remote PTT wireless network 112 via the intermediary device 114 of the intermediary wireless network 106 if the data is generated locally by (or at) the wireless interface device 104.

Thus, in an example embodiment, a device, such as wireless device 104, may operate as both a wireless PTT device (e.g., transmitting and receiving data directly with other local PTT devices within local PTT network 102), but also operate as a gateway or interface device for the local PTT sub-group 102 by: 1) transmitting or forwarding data received via a local PTT device to the remote PTT wireless network 112 via the intermediary network 106, and forwarding data received from a remote PTT wireless network 112 via the intermediary network 106 to one or more local PTT devices 116; and 2) forwarding locally generated data to both the local PTT wireless network and to one or more remote PTT wireless networks (e.g., by forwarding the data via an intermediary network 106).

According to an example embodiment, an apparatus may include a first wireless transceiver configured to transmit and receive data over a local push-to-talk (PTT) wireless network, a second wireless transceiver configured to transmit and receive data over a second wireless network in order to communicate with a device in a remote PTT wireless network coupled to the second wireless network, and a controller. The controller may be configured to select a mode of operation for the apparatus, including:

1) for data received via the first wireless transceiver or the second wireless transceiver, transmit or forward the received data via the second wireless transceiver or the first wireless transceiver, respectively;

2) for data originated or generated by the apparatus, transmit the data via both the first wireless transceiver and the second wireless transceiver.

The controller being configured to select a mode of operation may include, for example:

1a) for data received via the first wireless transceiver, transmit or forward the received data via the second wireless transceiver to an intermediary device within the second wireless network to allow the data to be forwarded by the intermediary device to the remote PTT wireless network;

1b) for data received via the second wireless transceiver, transmit or forward the received data via the first wireless transceiver directly or peer-to-peer to one or more devices within the first PTT wireless network; and 2) for data originated or generated by the apparatus, transmit the data via both the first wireless transceiver and the second wireless transceiver.

According to another example embodiment, a system may be provided. The system may include, for example, a wireless interface device coupled to a local push-to-talk (PTT) wireless network and a second wireless network, the wireless interface device may be configured to operate as both 1) a wireless device configured to communicate directly or in a peer-to-peer fashion with other wireless devices within the local PTT wireless network, and as 2) an interface device configured to forward data between the other wireless devices of the PTT wireless network and the second (or intermediary) wireless network.

The system may also include an intermediary device within the second (or intermediary) wireless network. The intermediary device may be configured to forward data between the wireless interface device (of the local PTT network) and a remote PTT wireless network, thereby extending the range (or operational or perceived range) of the local PTT network to the remote PTT network. The intermediary device may include, for example, a base station, an access point, a gateway, a PTT over cellular (PoC) server, a PTT over wireless server, or other device(s).

According to an example embodiment, referring to FIGS. 1 and 2, one or more wireless PTT devices 116 (e.g., 116A, 116B, or 116C) within wireless PTT network 102 may rely upon wireless interface device 104 to provide or facilitate communication with wireless devices outside local wireless PTT network 102 (or outside the local PTT sub-group 102). For example, communications (e.g., voice communications, text, email) from wireless PTT device 116A directed to a device located in a remote PTT wireless network (e.g., device 120A in network 112) may be forwarded from device 116A to interface device 104, and then forwarded from wireless interface device 104 to intermediary device 114, and then forwarded from intermediary device 114 to wireless interface device 118, and then from wireless interface device 118 to the remote PTT device 120A. Thus, in this example embodiment, communications between a device (e.g., 116A) of a local PTT wireless network 102 and a device (e.g., 120A) of a remote PTT wireless network 112 may be provided via local wireless interface device 104, intermediary device 114, and a remote wireless interface device 118, for example. In this manner, the perceived or operational coverage of a local PTT wireless network may be increased, for example.

Figure 5:
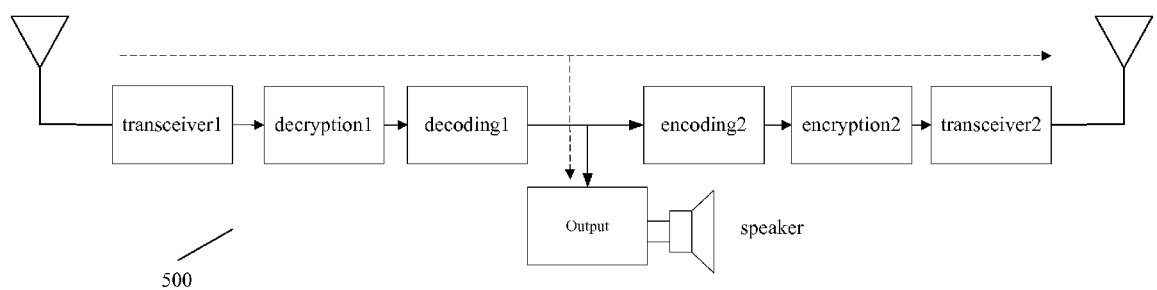
FIG. 5 is a block diagram showing a method of forwarding data between a local push-to-talk (PTT) wireless network and a remote PTT wireless network.

FIG. 5 is a block diagram of a system that may be provided in a wireless interface device according to an example embodiment. System 500 may be provided within wireless interface device 104, for example. The system 500 in FIG. 5 may illustrate the operation of device 104 when data is received at device 104 from one of the wireless networks via a first transceiver (transceiver 1). For example, data may be received from a first wireless network (e.g., local PTT network 102) by a first transceiver (transceiver1), decrypted by decryption1 block, decoded by decoding1 block (e.g., which may provide network 1-compatible forward error correction or FEC, audio, video and/or speech decoding), and then output to a user of device 104 via one or more output devices at device 104, such as a speaker, display, etc. The output from decoding1 block may at the same time be encoded by encoding2 block to provide network 2-compatible encoding (e.g., FEC, audio, video and/or speech encoding), encrypted by encoding2 block (to provide network 2-compatible encryption), and transmitted via transceiver2 to network 2 (e.g., intermediary network 106). In this manner, data may be received from one of the two networks (e.g., from a local PTT wireless network) and processed (e.g., demodulated, decrypted, decoded) and output to the device 104, and also re-processed (e.g., encoded, encrypted, modulated) and then transmitted or forwarded to the other of the two wireless networks (e.g., intermediary network 104). Thus, data received from one of the networks may be forwarded to the other wireless network and output to a user of the wireless interface device 104, according to an example embodiment.

Thus, data (e.g., speech or text or other data) received from a remote PTT wireless network 112 may be forwarded to wireless interface device 104, and then processed and output locally at device 104 as well as transmitted to the local PTT wireless network, for example. Likewise, data received from local PTT wireless network 102 may be processed and output locally by device 104, and also processed for transmission to remote PTT wireless network via intermediary network 106, for example.

Figure 6:
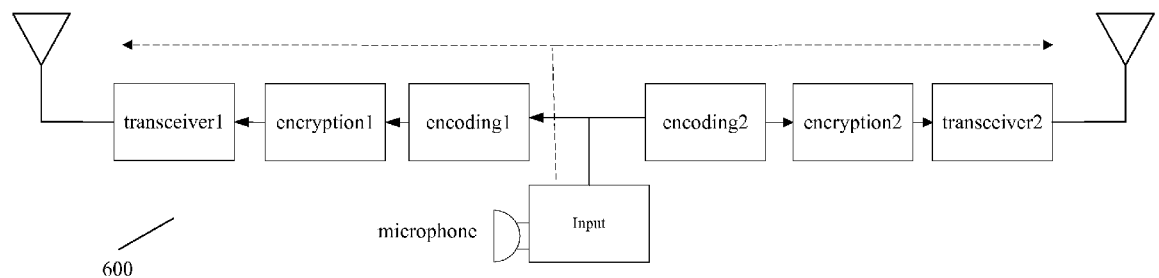
FIG. 6 is a block diagram showing a method of transmitting generated or originated data to local or remote wireless PTT networks.

FIG. 6 is a block diagram of a system that may be provided in a wireless interface device according to an example embodiment. System 600 may be provided within wireless interface device 104, for example. The system 600 in FIG. 6 may illustrate an example operation of device 104 when data is originated or generated by wireless interface device 104. Data may be provided or input by a user, e.g., via an input device such as a microphone (e.g., speech data), a keypad (text data) or other input device of device 104. The data may then be processed via two branches of system 500 for transmission over a first network (e.g., local PTT wireless network 102) and a second network (e.g., an intermediary network 106). For example, the data originated by device 104 may be encoded by encoding1 block (e.g., FEC, audio, speech, and/or video encoding), encrypted by encryption1 block, and transmitted via transceiver1, for example. Similarly, the received data may be encoded by encoding2 block, encrypted by encryption2 block, and transmitted via transceiver2. Thus, when data (e.g., speech, text or other data) is generated by device 104, in an example embodiment, both encoding blocks, both encryption blocks and both transceivers may be used, if necessary, to process the received data for transmission. The ordering of the blocks may be changed, for example. In some cases, blocks may be shared, e.g., if a same encoding or encryption is used by both networks.

According to an example embodiment, a list-before-talk technique may be used by wireless interface device 104 to sense the wireless media of local PTT wireless network before transmitting data. Data may be transmitted over the local PTT wireless network if the media of network 102 is sensed as idle. Likewise, according to an example embodiment, wireless interface device may request wireless interface device 118 of remote PTT wireless network 112 to sense the media before transmitting the data over remote wireless network. Device 118 may send a message via intermediary network 106 to device 104 to indicate a status (e.g., busy or idle) of the wireless media of remote PTT wireless network 112. For example, if one of the networks (102, 112) is sensed as busy, the wireless device may wait until both networks are idle before transmitting the data, or may transmit on each network independently when that network is idle. Other example embodiments or techniques may be used.

In an example embodiment, the phone book 228 maintained by wireless interface device 104 may include an access list 229 for one or more local wireless devices located within local PTT wireless network 102 (e.g., an access list for each of local devices 116A, 116B, 116C, etc.). According to an example embodiment, wireless interface device 104 may forward communications (e.g., text or email messages, voice, audio) between a wireless device (e.g., device 116A) of a local PTT network 102 and a remote device (e.g., 120A) located outside of the local PTT wireless network (e.g., device 120A) only if the remote device is on the access list for the local device. For example, a user of wireless interface device 104 may program or select only a few numbers or people, outside of the local PTT network 102, that wireless device 116A may be able to call and receive calls from, or otherwise communicate with.

According to an example embodiment, the access list 229 may identify one or more devices external to the local PTT wireless network which may communicate with a wireless device in the local PTT wireless network via the apparatus. According to an example embodiment, the access list 229 may be a phone book or address book, or may be a portion of an address book or phone book provided with wireless interface device 104, for example.

Thus, in an example embodiment, wireless device 116A may be able to communicate (e.g., directly or peer to peer) with one or more (or even all) other PTT wireless devices (e.g., 104, 116B, 116C) within local PTT network 102. However, in order for PTT device 116A to communicate (e.g., send and receive voice calls, text messages, transmit and receive email, etc.) with addressed devices (e.g., wireless devices or other devices) located outside of the local PTT network 102, such as wireless devices within a remote PTT network or other devices (e.g., cellular devices, landline telephones, external email), all such communication for the device 116A with devices outside the local PTT network should go through the wireless interface device 104, and may be limited to those remote (or external) devices listed or identified on the access list for device 116A, for example.

In an example embodiment, the access list 229 on device 104 may specify certain types of communication that are permitted for each device: e.g., for the access list on device 104 for device 116A, voice calls, text messages and email may be permitted for a first external device, only voice calls permitted for a second external device, and only emails permitted for a third external device, as an example (for device 116A).

As another example, a parent may operate wireless interface device 104, and a child may have a PTT wireless device 116A within the same local PTT network 102. An access list 229 for device 116A may be provided (e.g., programmed or configured by the parent using the user interface 216) on the parent's wireless interface device 104, listing only identifiers (e.g., names, addresses, telephone numbers or other identifiers) associated with the parent, the Aunt and the Grandfather of the child. Thus, in this example, the child, operating PTT device 116A, would be able to communicate with one or more (or even all) of the local PTT devices within the local PTT network 102, and may be able to communicate with external or remote devices (e.g., devices outside the local PTT network) only for those devices listed on the access list for device 116A (e.g., with devices for the parent, grandfather and Aunt in this case).

FIG. 4 is a flow chart illustrating operation of a wireless device according to an example embodiment. At 402, a request may be received for communication between a local push-to-talk (PTT) device within a local PTT network and a device outside the local PTT network. The request may be a voice call or PTT transmission, an email, text message, or other data transmission or request, received at wireless interface device 104 from local PTT device 116A or from a (external) device (e.g., device 120A or other device) located outside the local PTT network. This may include receiving data from the local PTT device to be forwarded to the device outside the local PTT network, or receiving data from the device 120A located outside the local PTT network to be forwarded to the local PTT device.

At 404, it may be determined that the device (e.g., wireless device, wireline device) outside the local PTT network is on an access list for the local PTT device. For example, based on an identifier (e.g., address, name, telephone number), the wireless interface device 104 may compare the identifier (of the device located outside the local PTT network) to the access list 229 for the local PTT device 116A to determine that this external device is on the access list 229. The device outside the local PTT network may be a cell phone, PDA, PTT device in another PTT network At 406, the requested communication may be provided based on the determining. This may include, for example forwarding data from the local PTT device to the device outside the local PTT network (or vice versa) if the device outside the local PTT network is listed on the access list for the local PTT device. The forwarding may include, for example, forwarding an email or text message or other data, establishing or forwarding voice or speech data for a voice call or PTT call, etc., as requested.

In addition, a storage medium may be provided that includes stored instructions, when executed by a controller or processor that may result in the controller performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art

What is claimed is:

1. An apparatus comprising:
   a first wireless transceiver configured to transmit and receive data over a local push-to-talk (PTT) wireless network;
   a second wireless transceiver configured to transmit and receive data over a second wireless network in order to communicate with a device in a remote PTT wireless network coupled to the second wireless network; and
   a controller, wherein the controller is configured to select a mode of operation for the apparatus, including:
      for data received via the first wireless transceiver, transmit or forward the received data via the second wireless transceiver to an intermediary device within the second wireless network to allow the data to be forwarded by the intermediary device to the remote PTT wireless network;
      for data received via the second wireless transceiver, transmit or forward the received data via the first wireless transceiver directly or peer-to-peer to one or more devices within the first PTT wireless network; and
      for data originated or generated by the apparatus, transmit the data originated or generated by the apparatus, via both the first wireless transceiver and the second wireless transceiver.

2. The apparatus of claim 1 where the mode of operation may be selectively enabled.

3. The apparatus of claim 1 wherein the apparatus may be configurable to operate either one of the modes of operation or in combination thereof.

4. The apparatus of claim 1 wherein the first wireless transceiver is configured to exchange data directly or peer-to-peer with one or more wireless devices within a local PTT sub-group.

5. The apparatus of claim 1 wherein the second wireless transceiver is configured to exchange data with an intermediary device in a second wireless network in order to communicate with a wireless device in a remote PTT sub-group via the intermediary device.

6. The apparatus of claim 1 wherein the local push-to-talk (PTT) wireless network comprises a local Digital Mobile Radio (DMR) sub-group having one or more wireless devices that may communicate directly or peer-to-peer with the apparatus.

7. The apparatus of claim 1 wherein the remote push-to-talk (PTT) wireless network comprises a remote Digital Mobile Radio (DMR) sub-group having two or more wireless devices that may communicate with each other directly or peer-to-peer within the remote DMR.

8. The apparatus of claim 1 and further comprising:
   a first audio codec configured to encode audio data for communication via the first wireless transceiver and to decode audio data received via the first wireless transceiver; and
   a second audio codec configured to encode audio data for communication via the second wireless transceiver and to decode audio data received via the second wireless transceiver.

9. The apparatus of claim 8 wherein the first audio codec comprises a first speech codec, and the second audio codec comprises a second speech codec.

10. The apparatus of claim 1 and further comprising an access list identifying one or more devices external to the local PTT wireless network which may communicate with a wireless device in the local PTT wireless network via the apparatus.

11. The apparatus of claim 10 wherein the access list comprises an address book, a phone book, or a portion of the address book or phone book.

12. A method comprising:
    determining, by a processor, to forward data to a remote push-to-talk (PTT) wireless network via an intermediary device of an intermediary wireless network if the data is received from a wireless device of a local push-to-talk (PTT) wireless network;

determining, by a processor, to forward data directly to one or more wireless devices of the local PTT wireless network if the data is received from the remote PTT wireless network via the intermediary device, the forwarding data directly comprising, receiving audio data of a second encoded format from an intermediary device via a second wireless transceiver, using a second audio codec to decode the received audio data of the second encoded format, using a first audio codec to encode the decoded audio data into a first encoded format; and transmitting, via a first wireless transceiver, the encoded audio data of the first encoded format to one or more wireless devices of the local PTT wireless network; and determining, by a processor, to forward data to one or more wireless devices of the local PTT wireless network and to the remote PTT wireless network via the intermediary device of the intermediary wireless network if the data is generated locally.

13. The method of claim 12 wherein the forwarding data to the remote push-to-talk (PTT) wireless network comprises:

receiving audio data from a wireless device of a local push-to-talk (PTT) wireless network via a first wireless transceiver;

using a first audio codec to decode the received audio data of a first encoded format;

using a second audio codec to encode the decoded audio data into a second encoded format; and transmitting, using a first wireless transceiver, the encoded audio data of the second encoded format to a remote push-to-talk (PTT) wireless network via an intermediary device.

14. The method of claim 12 wherein the forwarding data to one or more wireless devices of the local PTT wireless network and to the remote PTT wireless network comprises:

forwarding data to one or more wireless devices of the local PTT wireless network and to the remote PTT wireless network via the intermediary device of the intermediary wireless network if the data is locally generated or input audio or other input data.

15. An apparatus comprising:

at least one processor;

at least one memory including computer program code for one or more programs, the at least one memory and the computer program code configured to, with the at least one processor, cause the apparatus to perform at least the following, determine to forward data to a remote push-to-talk (PTT) wireless network via an intermediary device of an intermediary wireless network if the data is received from a wireless device of a local push-to-talk (PTT) wireless network;

determine to forward data directly to one or more wireless devices of the local PTT wireless network if the data is received from the remote PTT wireless network via the intermediary device; and determine to forward data to one or more wireless devices of the local PTT wireless network and to the remote PTT wireless network via the intermediary device of the second wireless network if the data is generated locally by the apparatus; and a user interface which is configured to allow a user to select the apparatus as a gateway or a wireless interface device for forwarding data between one or more devices of the local PTT wireless network and the remote PTT wireless network, wherein, after being selected as a gateway or wireless interface device, the apparatus is configured to send a signal to the one or more wireless devices in the local PTT wireless network, said signal indicating that the apparatus is the gateway or wireless interface device.

16. The apparatus of claim 15 wherein the data comprises audio and/or speech data.

17. The apparatus of claim 15, wherein:

the memory is configured to store addresses or identities of the wireless devices of the local PTT network; and the controller is configured to access the memory and encode one or more the plurality of addresses or identities to be transmitted to the one or more wireless devices of the PTT network.

18. The apparatus of claim 15, wherein:

the memory is configured to store addresses or identities of the wireless devices of the local PTT network; and the controller is configured to access the memory and use the memory to block data which do not include an address or identity matching one of the stored addresses or identities.

19. The apparatus of claim 15 further comprising:

a first codec configured to encode or decode data forwarded to or received from the intermediary device, respectively; and a second codec configured to encode or decode data forwarded to or received from the local PTT network, respectively.

20. The apparatus of claim 15 wherein the apparatus is further configured to determine members of the remote PTT network based on the data received from the remote PTT wireless network via the intermediary device.

* * * * *